(12) United States Patent
Corrigan et al.

(10) Patent No.: US 6,772,259 B2
(45) Date of Patent: Aug. 3, 2004

(54) INTERRUPT HANDLERS USED IN DIFFERENT MODES OF OPERATIONS

(75) Inventors: Michael Joseph Corrigan, Rochester, MN (US); David Robert Engebretsen, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 09/952,852

(22) Filed: Sep. 12, 2001

(65) Prior Publication Data

US 2003/0051087 A1 Mar. 13, 2003

(51) Int. Cl.[7] .............................. G06F 13/24; G06F 9/48
(52) U.S. Cl. ......................................... 710/260; 712/13
(58) Field of Search ........................ 710/260, 36, 266, 710/48, 262, 269, 261; 718/104; 712/13, 20, 228, 229, 233, 244; 709/213; 711/153; 713/100

(56) References Cited

U.S. PATENT DOCUMENTS 4,843,541 A * 6/1989 Bean et al. .................... 710/36
6,247,109 B1 * 6/2001 Kleinsorge et al. ........... 712/13
6,374,286 B1 * 4/2002 Gee et al. ................... 718/108
6,467,007 B1 * 10/2002 Armstrong et al. ......... 710/260

OTHER PUBLICATIONS

"Online reconfiguration in replicated data bases based on group communication" by Kemme, B. Bartoli, A. and Babaoglu, O. (abstract only).*

* cited by examiner

*Primary Examiner*—Gopal C. Ray
(74) *Attorney, Agent, or Firm*—Moser, Patterson & Sheridan, LLP

(57) ABSTRACT

According to the present invention, when an interrupt occurs in a computer system running an operating system, control takes a separate code path in the operating system, depending on whether the computer system is in non-partitioned mode or partitioned mode, before converging to a common mode-independent interrupt handler that services the interrupt. Along each separate code path, hardware state of the computer system which is relevant to the processing of the interrupt is changed to a consistent hardware state so that the common mode-independent interrupt handler can run properly in both modes.

29 Claims, 3 Drawing Sheets

INTERRUPT HANDLERS USED IN DIFFERENT MODES OF OPERATIONS

BACKGROUND OF THE INVENTION

1. Field of the Invention

The present invention generally relates to interrupt handlers, and more particularly to interrupt handlers that consistently handle interrupts regardless of whether the interrupts occur in a non-partitioned system or in a partitioned system.

2. Description of the Related Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The AS/400 computer system developed by IBM is an example of a computer system that supports logical partitioning. If logical partitioning on an AS/400 is desired, partition manager code referred to as a "hypervisor" in AS/400 terminology is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

In a computer system with no logical partitions, a partition manager is not needed, and the operating system controls access to the computer system resources. In a computer system that has one or more logical partitions, the partition manager controls access to the computer system resources and the operating system installed in each logical partition uses the partition manager to perform its functions. Because both the operating system and the partition manager must be able to manage the resources in a computer system, the low-level functions of an operating system are typically implemented in a partition manager as well. In known systems, the partition manager is separate from the operating system, and the partition manager is generally maintained separately from the operating system. Because they share similar functions, a change to a common function in one will typically require a corresponding change in the other.

In both partitioned and non-partitioned environments, a software-based reset mechanism is typically supported to permit one processor to initiate a reset of another processor. Typically, a software based reset mechanism relies on the use of interrupts, often referred to as interprocessor interrupts (IPI's), to cause a hung processor to reset and restore itself to a known state. An IPI, like all interrupts, causes a processor to cease all current operations and immediately jump to a dedicated program code, referred to as an "interrupt handler", to handle the interrupt.

One problem which arises in the context of partitioned and non-partitioned environments is that the interrupt handler must be coded differently for each environment. This is because the manner in which the interrupt handler is called is dependent upon the hardware state of the environment, which is different for partitioned and non-partitioned systems.

One attempt to solve this problem is to virtualize the hardware. By virtualizing the hardware, the interrupt handler does not see the different states depending on the mode, i.e., partitioned vs. non-partitioned. However, this approach requires hardware changes which are expensive and, therefore, undesirable.

Therefore, there is a need for a method and system of consistently handling interrupts regardless of whether the interrupts occur in a non-partitioned system or in a partitioned system.

SUMMARY OF THE INVENTION

In one embodiment, a method of handling an interrupt in a computer system is provided. The method comprises, if the computer system is in a first mode of operation, executing a first code portion and then executing a common, mode-independent interrupt handler; and if the computer system is in a second mode of operation, executing a second code portion and then executing the common, mode-independent interrupt handler. The first mode of operation may be a non-partitioned mode, while the second mode of operation may be a partitioned mode.

In another embodiment, a computer system is provided comprising a system bus, a processor coupled to the system bus and a memory coupled to the system bus, the memory containing a first code portion, a second code portion, and a common, mode-independent interrupt handler. If the computer system runs in a non-partitioned mode of operation and encounters an interrupt, the computer system is configured to execute the first code portion and then execute the common, mode-independent interrupt handler. If the computer system runs in a partitioned mode of operation and encounters an interrupt, the computer system is configured to execute the second code portion and then execute the common, mode-independent interrupt handler.

In still another embodiment, a computer readable medium storing a software program is provided. The program, when executed, causes a processor to perform operations comprising, (i) if the computer system is in a non-partitioned mode of operation, executing a first code portion and then executing a common, mode-independent interrupt handler; and (ii) if the computer system is in a partitioned mode of operation, executing a second code portion and then executing the common, mode independent interrupt handler.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

According to the present invention, when an interrupt occurs in a computer system running an operating system, control takes a separate code path in the operating system, depending on whether the computer system is in non-partitioned mode or partitioned mode, before converging to a common, mode-independent interrupt handler that services the interrupt. Along each separate code path, hardware state of the computer system which is relevant to the processing of the interrupt is changed to a consistent hardware state so that the common, mode-independent interrupt handler can run properly in both modes.

One embodiment of the invention is implemented as a program product for use with a computer system such as, for example, the system 100 of FIG. 1 and system 200 of FIG. 2 described below. The program(s) of the program product defines functions of the embodiments (including the methods described below with reference to FIG. 3) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
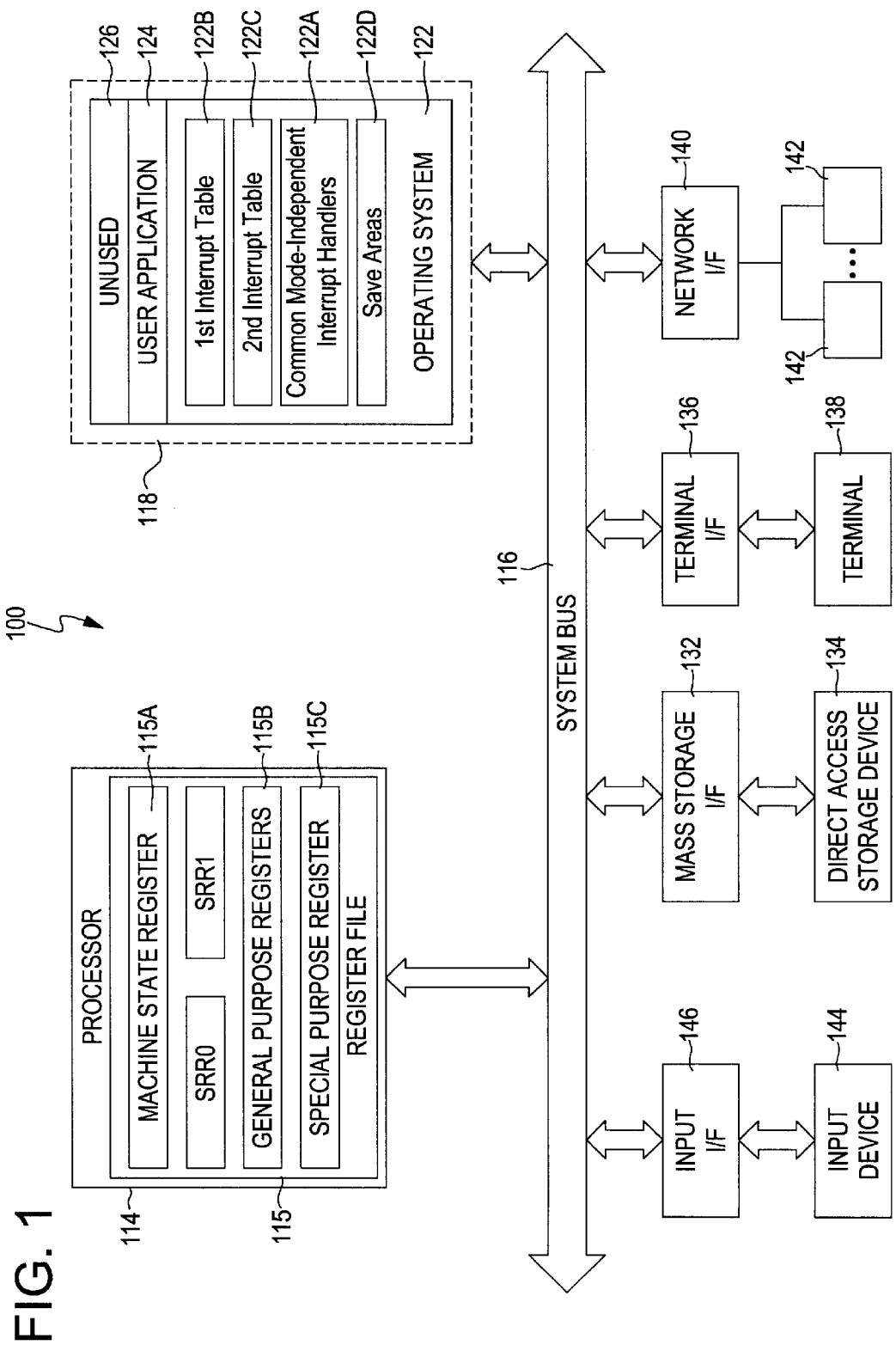
FIG. 1 is a computer system 100 operating in non-partitioned mode according to an embodiment of the present invention.

FIG. 1 shows one embodiment of a computer system 100, which is configured in a non-partitioned mode. Although a specific hardware configuration is shown for data processing system 100, embodiments of the present invention can apply to any hardware configuration that allows non-partitioned operation. For purposes of the invention, computer system 100 may represent practically any type of computer, computer system, or other programmable electronic device that allows non-partitioned operation, including a client computer, a server computer, a portable computer, an embedded controller, etc. The computer system 100 may be a stand-alone device or networked into a larger system.

In general, computer system 100 includes at least one processor 114 to obtain instructions and data via a system bus 116 from a main memory 118. Processor 114 includes a register file 115 which, illustratively, includes a machine state register 115A, two registers SRR0 and SRR1, a plurality of general purpose registers 115B, and a special purpose register 115C. Illustratively, processor 114 is any processor configured to support the methods described herein. Illustratively, computer system 100 also includes a mass storage interface 132 coupled to a storage device 134, a terminal interface 136 coupled to a terminal 138, and a network interface 140 coupled to a plurality of networked devices 142. In one embodiment, terminal 138 is any display device such as a cathode ray tube (CRT) or a plasma screen. In another embodiment, terminal 138 and networked devices 142 are desktop or PC-based computers, workstations, network terminals, or other networked computer systems. The computer 100 also includes an input device 144 coupled to system bus 116 via an input interface 146. Input device 144 can be any device to give input to the client computer 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

In one embodiment, storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Memory 118 and storage 134 could be part of one virtual address space spanning multiple primary and secondary storage devices.

The contents of memory 118 can be loaded from and stored to the storage 134 as processor 114 has a need for it. Memory 118 is any memory device sufficiently large to hold the necessary programming and data structures of the invention. As an illustration, the main memory 118 could be one or a combination of memory devices, including random access memory (RAM), non-volatile or backup memory such as programmable or flash memory or read-only memory (ROM). The main memory 118 may be physically located in another part of the computer system 100. While memory 118 is shown as a single entity, it should be understood that memory 118 may in fact comprise a plurality of modules, and that the memory 118 may exist at multiple levels, from high speed registers and caches to lower speed but larger DRAM chips.

Illustratively, the main memory 118 includes an operating system 122, a user application 124 and an unused memory portion 126. According to an embodiment, operating system 122 includes, among other things, common, mode-independent interrupt handlers 122A, a first interrupt table 122B, a second interrupt table 122C, and save areas 122D. More about these components of the operating system 122 will be discussed later with reference to FIG. 3. The user program 124 is representative of any application which may be executed by a processor 114. Further, persons skilled in the art will recognize that some conventional software components (e.g., an application programming interface (API)), while not explicitly shown, are nevertheless contemplated.

Figure 2:
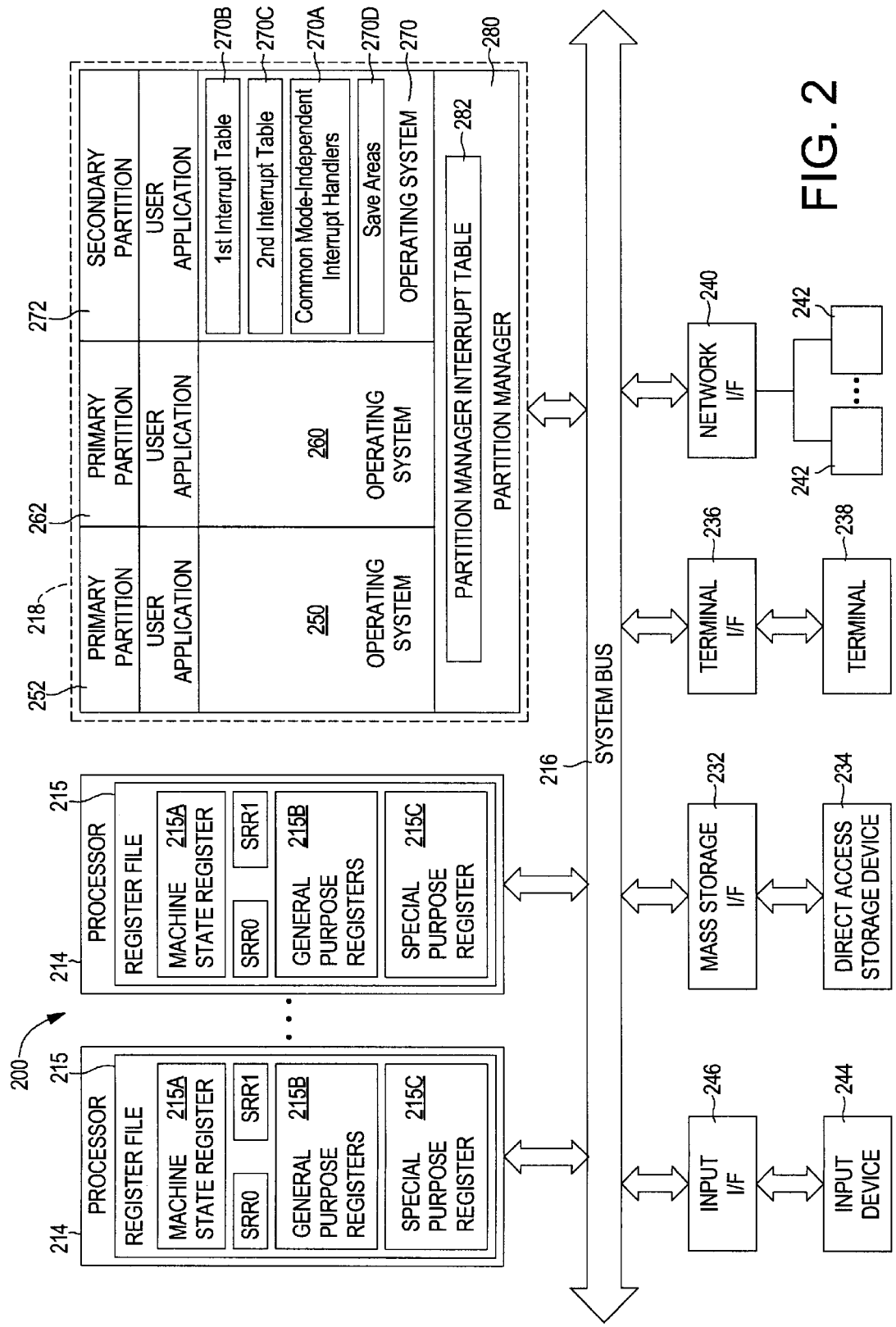
FIG. 2 is a computer system 200 operating in partitioned mode according to an embodiment of the present invention.

One embodiment of a partitioned processing system is shown in FIG. 2. System 200 is in many ways similar to system 100 of FIG. 1, except that the system 200 includes a main memory 218 having a different allocation scheme. Therefore, the hardware architecture aspect of system 200 is not described here. System 100 of FIG. 1 and system 200 of FIG. 2 may depict a single hardware system which is configured to operate as a non-partitioned system at one time but is configured to operate as a partitioned system at another time. Although FIG. 2 is shown with multiple processors, one processor is sufficient for operation.

System 200 is logically partitioned, illustratively, into three partitions 252, 262, and 272, of which the partition 252 is a primary partition, partitions 262 and 272 are secondary partitions. The terms "primary" and "secondary" are merely for ease of reference and do not denote a significant feature of the partitions. Each partition 252, 262, 272 has an operating system 250, 260, 270, respectively. The operating systems 250, 260, 270 can be any operating system that can run in a logical partition. For example, the operating system 250 in primary partition 252 can be OS/400 V5R1, the operating system 260 in secondary partition 262 can be OS/400 V4R5, etc. Illustratively, the operating system 270 contains, among other things, common, mode-independent interrupt handlers 270A, a first interrupt table 270B, a second interrupt table 270C, and save areas 270D associated with processors 214 assigned to the partition 272. These components of the operating system 270 are the same (same binary image) as the common, mode-independent interrupt handlers 122A, the first interrupt table 122B, the second interrupt table 122C, and the save areas 122D, respectively, of the operating system 122 of FIG. 1. Except for the identical mode-independent interrupt handlers, first interrupt tables, second interrupt tables, and save areas, the rest of the two operating systems 122 (FIG. 1) and 270 (FIG. 2) may also be the same or different.

Each operating system 250, 260, and 270 controls a number of processors 214 and access devices, including input interface 246, mass storage interface 232, terminal interface 236 and network interface 240. Illustratively, operating system 250 controls a first processor 214 and input interface 246. Operating system 260 controls a second and a third processor 214 and mass storage interface 232. Operating system 270 controls the rest of the resources in system 200 including any remaining processors 214, terminal interface 236, and network interface 240. However, the resources can be shared among logical partitions. For instance, mass storage interface 232 can be shared between primary partition 252 and secondary partition 262.

Each of the operating systems 250, 260, 270 are under the control of a partition manager 280. Illustratively, the partition manager 280 is a logical partition manager routine known in the art that manages the allocation of computer system resources to a plurality of partitions. More specifically, the partition manager 280 is responsible for allocating resources to a partition, installing an operating system in a partition, starting and stopping the operating system in a partition, dumping main storage of a partition, communicating between partitions, and providing other functions. In the embodiment shown in FIG. 2, for instance, the partition manager 280 allocates a first processor 214 and the input interface 246 to primary partition 252, second and third processors 214 and mass storage interface 232 to secondary partition 262, and any remaining processors 214 and other resources to secondary partition 272. The allocation of processors 214 and other resources by the partition manager 280 is based on user demands. In another embodiment, a processor 214 or the mass storage interface 232 may be shared between logical partitions 250, 260, 270 under the control of the partition manager 280. According to one embodiment, the partition manager 280 comprises a partition manager interrupt table 282 which is accessed any time an interrupt occurs in the partitioned system 200. More details regarding the partition manager interrupt table 282 are provided below with reference to FIG. 3.

During operation, the computer systems 100 (FIG. 1) and 200 (FIG. 2) will, from time to time, encounter an interrupt. For instance, in non-partitioned system 100, input interface 146 may cause an interrupt in a processor 114 so that the processor 114 stops whatever it is doing and reads data from the input interface 146 into memory 118, and then resumes where it was when the interrupt occurred. In system 200 of FIG. 2, for example, terminal interface 236 may cause an interrupt in a processor 214 which was allocated to the secondary partitioned 272, so that the processor 214 stops whatever it is doing and loads data from memory 118 to terminal interface 236, and then resumes where it was when the interrupt occurred. These examples above are merely illustration and a person skilled in the art will recognize other reasons for interrupts.

According to the present invention, ultimately, a common, mode-independent interrupt handler is called to handle the interrupt regardless of whether the interrupt occurs in a non-partitioned system, such as computer 100 (FIG. 1), or a non-partitioned system, such as computer 200 (FIG. 2). Embodiments for handling interrupts in accordance to the present invention are described in more details below.

Figure 3:
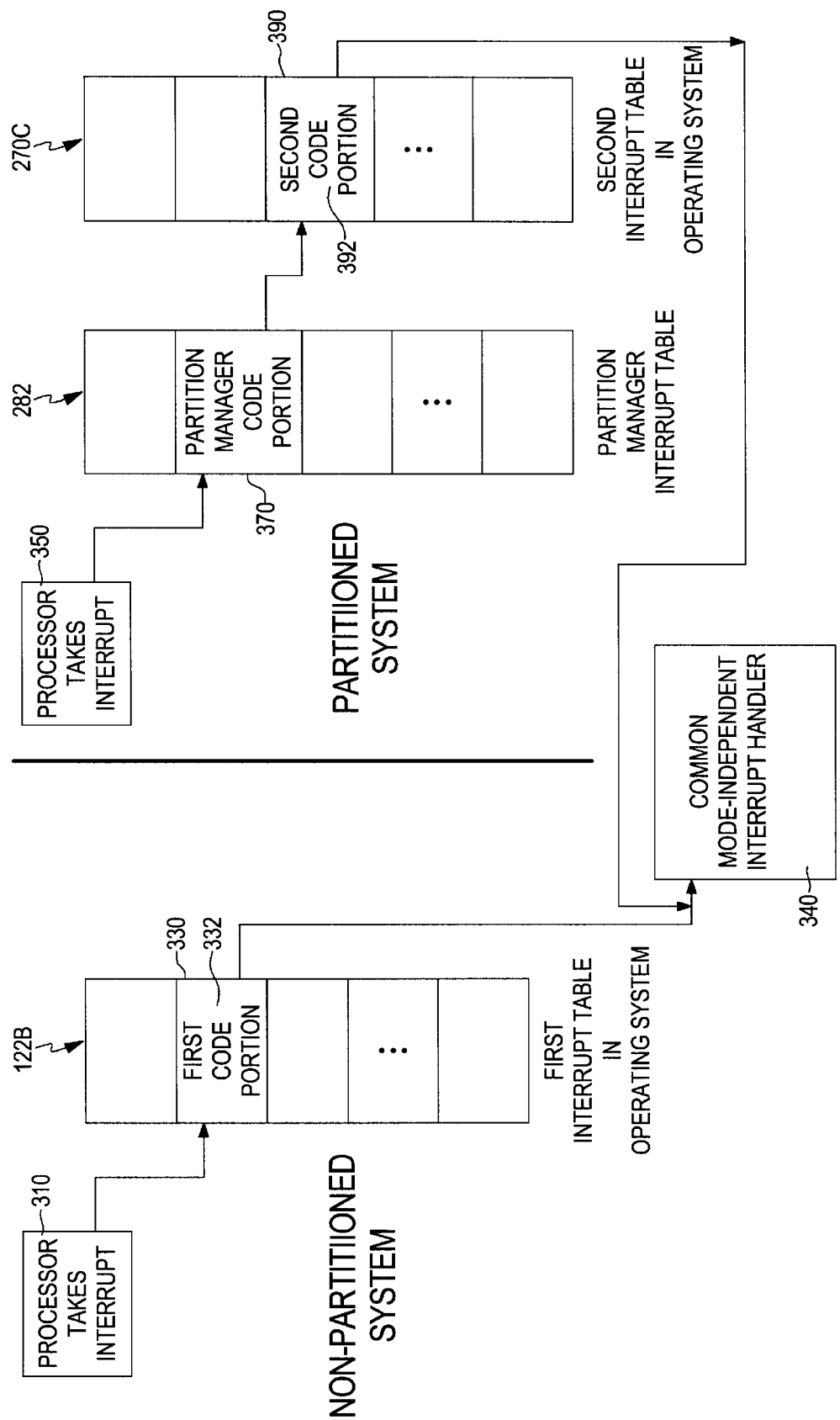
FIG. 3 is a block diagram showing the processing of an interrupt in accordance to an embodiment of the present invention.

FIG. 3 is divided into two parts with the left part depicting the execution flow in the non-partitioned system 100 (FIG. 1) and the right part depicting the execution flow in the partitioned system (FIG. 2). The use of the same reference number in different figures indicates the same component. With reference to the left half of FIG. 3, corresponding to the non-partitioned system 100 (FIG. 1), a processor takes an interrupt at block 310. For purposes of illustration it will be assumed that input interface 146 (FIG. 1) causes an interrupt in a processor 114 (FIG. 1) so that the processor 114 stops what it is doing and saves the address of the current instruction and the content of the machine state register 115A into two registers SRR0 and SRR1, respectively, which may be two registers of the register file 115 of the processor 114 (FIG. 1). The processor 114 also disables relocation before jumping to an entry 330 in a first interrupt table 122B (also in FIG. 1) in the operating system 122 (FIG. 1). The location of the entry 330 was specified either by polling each device in the system 100 to identify the interrupting device or by using a vectored interrupt structure in which the interrupting device provides the processor 114 (FIG. 1) its address (vector) where the processor can finds the corresponding interrupt service routine. As is well known, relocation is a mechanism in which a logical memory address is translated into a physical address which is sent on the system bus to the system memory. Relocation solves the problem arising when a program is loaded into memory at a location different than that the programmer expected. For example, suppose a main program, user-written procedures, and library procedures are linked together by a linker to form a combined program. The linker must know where the combined program starts in memory. Suppose further that the combined program is to be loaded to address 200K and that the first instruction of the combined program is a call to a procedure at relative address 100 within the combined program produced by the linker. Without relocation, processor will jump to absolute address 100. What is needed is a call to address 200K+100. With relocation, the instructions of the combined program are modified as they are loaded into memory such that each address will have 200K added to it.

At the entry 330 in the first interrupt table 122B, the processor 114 finds and executes a first code portion 332 contained in the entry 330. For each interrupt, there is a corresponding entry in the first interrupt table 122B and a corresponding first code portion in that entry. In FIG. 3, the first interrupt table 122B has a plurality of blocks representing the entries, one block representing one entry. In one embodiment, each entry of the first interrupt table 122B has the same size for simplicity of design. However, in another embodiment, these entries may have different sizes.

The first code portion 332 may comprise instructions that save the contents of general purpose registers 115B (FIG. 1) into a save area 122D of the operating system 122 in FIG. 1 (called "paca" (processor address communications area) in the terminology of PowerPC, manufactured by International Business Machine, Armunk, N.Y.). The save area 122D contains information unique to each processor. Therefore, an array of the save areas 122D is created, one for each processor 114 (FIG. 1). The primary use of the save areas is as a save location during interrupt processing. The special purpose register 115C in each processor 114 always points to the virtual address of the save area 122D associated with that processor 114. Upon an interrupt, the value stored in the special purpose register 115C is read and used as a base pointer to the save area 122D. The information of each processor 114 immediately before an interrupt will be later retrieved from the save area 122D for that processor 114 and put back to the general purpose registers 115B of that processor 114 so that the interrupted program does not see any change in the content of the register file 115 it was using when the interrupt occurred.

The first code portion 332 also comprises instructions that save the contents of the registers SRR0 and SRR1, which contain the address of the interrupted instruction and the content of machine state register 115A immediately before the interrupt, respectively, into the save area 122D. At the end of the first code portion 332, the processor 114 enables relocation and jumps to a common, mode-independent interrupt handler 340 in the operating system 122. The common mode-independent interrupt handler 340 may be any known or unknown interrupt handler that services the interrupt caused by the input interface 146 (FIG. 1). In the case of the present example, the common mode-independent interrupt handler 340 causes the processor 114 to load data from input interface 146 (FIG. 1) into memory 118 (FIG. 1).

The common, mode-independent interrupt handler 340 is one of the common, mode-independent interrupt handlers 122A in the operating system 122 (FIG. 1). There is a common, mode-independent interrupt handler for each interrupt. However, for purposes of simplicity, only one common, mode-independent interrupt handler 340 is shown because it is the only interrupt handler involved in the interrupt caused by the input interface 146 (FIG. 1). However, there are situations in which one common, mode-independent interrupt handler may call one or more other common, mode-independent interrupt handlers to service the interrupt.

Relocation must be turned on before the processor 114 executes the common, mode-independent interrupt handler 340 because the common, mode-independent interrupt handler 340 was written using logical addresses. If relocation is off, any logical address will be considered an absolute physical address and the processor 114 will erroneously operate on unintended places of memory.

With reference now to the right half of FIG. 3, corresponding to the partitioned system 200 (FIG. 2), an interrupt is taken by a processor at block 350. For purposes of illustration, it is assumed that input interface 246 (FIG. 2) causes an interrupt in a processor 214 (FIG. 2) which, illustratively, was assigned to logical partition 272. Thus, the processor 214 stops its current operations and saves the address of the current instruction and the content of a machine state register 215A into two registers SRR0 and SRR1, respectively, which may be two registers of the register file 215 of the processor 214 (FIG. 2). The processor 214 also disables relocation before jumping to an entry 370 in the partition manager interrupt table 282 in the partition manager 280 (FIG. 2).

If the interrupt occurred in the non-partitioned system 100 (FIG. 1), the processor 214 would encounter the operating system 122 (FIG. 1). In the partitioned system 200, the processor 214 jumps to the same absolute physical address, specified either by the input interface 246 under a vectored interrupt structure or by a polling method, and finds the partition manager 280 (FIG. 2). At the entry 370 in the partition manager interrupt table 282, the processor 214 finds and executes a partition manager code portion contained in entry 370. For each interrupt, there is a corresponding entry in the partition manager interrupt table 282 and a corresponding partition manager code portion in that entry. The partition manager interrupt table 282 has a plurality of entries, like entry 370, each of which may have the same size for simplicity of design. For instance, the entries of the partition manager interrupt table 282 may have the size of 256 bytes each. In other embodiments, these entries may have different sizes. Except for the contents of the entries, the partition manager interrupt table 282 and the first interrupt table 122B may be the same in terms of the number of entries and the size of each entry.

The partition manager code portion 370, illustratively, contains instructions that save the contents of the registers SRR0 and SRR1, which contain the address of the interrupted instruction and the content of the machine state register 215A immediately before the interrupt, respectively, into the save area 270D associated with the processor 214. The reason for this is that, by design, the contents of SRR0 and SRR1 are changed by a special instruction located at the end of the partition manager code portion 370. This special instruction causes the processor 214 to jump to an entry 390 in the second interrupt table 270C, which is in the operating system 270 located in partition 272 of FIG. 2. As the result, the common mode-independent interrupt handler 340 should not expect that registers SRR0 and SRR1 contain the address of the interrupted instruction and the content of the machine state register 215A immediately before the interrupt, respectively. Instead, the common mode-independent interrupt handler 340 expects that the save area 270D contains the address of the interrupted instruction and the content of the machine state register 215A immediately before the interrupt. This is why the first code portion 332 (left part of FIG. 3) also comprises instructions that save the contents of the registers SRR0 and SRR1, which contain the address of the interrupted instruction and the content of machine state register 115A immediately before the interrupt, respectively, into the save area 122D, even though the first code portion 332 does not affect the contents of the registers SRR0 and SRR1.

The special instruction that causes the processor 214 to jump to the entry 390 in the second interrupt table 270C also enables relocation. With relocation enabled, the second interrupt table 270C and its entries need not be placed at absolute physical addresses defined by system design. In the entry 390 in the second interrupt table 270C, the processor 214 finds and executes a second code portion 392. For each interrupt, there is a corresponding entry in the second interrupt table 270C and a corresponding second code portion in that entry. In FIG. 3, the second interrupt table 270C has a plurality of entries, like entry 390, each of which may have the same size for simplicity of design. For instance, the entries of the second interrupt table 270C may have the size of 256 bytes each. In other embodiments, however, these entries may have different sizes.

The second code portion 392 may comprise instructions that save the contents of general purpose registers 215B (FIG. 2) of the processor 214 into a save area 270D of the operating system 270 in FIG. 2. A special purpose register 215C in each processor 214 always points to the virtual address of the save area 270D associated with that processor 214. Upon an interrupt, the value stored in the special purpose register 215C is read and used as a base pointer to the save area 270D. The information of each processor 214 immediately before an interrupt will be later retrieved from the save area 270D for that processor 214 and put back to the general purpose registers 215B of that processor 214 so that the interrupted program does not see any change in the register file 215 it was using when the interrupt occurred. Because the partition manager has saved contents of the registers SRR0 and SRR1, which contain the address of the interrupted instruction and the content of the machine state register 215A immediately before the interrupt, respectively, into the save area 270D, the second code portion 392 does not need to perform the same tasks again.

At the end of the second code portion 392, the processor 214 jumps to the same common, mode-independent interrupt handler 340 which is one of the interrupt handlers 270A in the operating system 270 in logical partition 272 of partitioned system 200 of FIG. 2. Relocation does not need to be enabled in the second code portion 392 because relocation was enabled earlier by the partition manager code portion 370.

Some instructions in the partition manager code portion 370 can be moved to the second code portion 392 and vice versa. For instance, the saving instructions that cause the contents of general purpose registers 215B (FIG. 2) of the processor 214 to be saved into a save area 270D of the operating system 272 can be moved from the second code portion 392 to the partition manager code portion 370. However, if a small partition manager interrupt table 282 is preferred, this configuration may not be desirable.

As mentioned above, the operating system 122 of FIG. 1 and the operating system 270 in the partition 272 of FIG. 2 have identical common, mode-independent interrupt handlers (122A, 270A), first interrupt tables (122B, 270B), second interrupt tables (122C, 270C), and save areas (122D, 270D). When the operating system 122 is used in non-partition system 100, the second interrupt table 122C is present in the operating system 122 but never used. Only the first interrupt table 122B is used. This can be seen in the left part of FIG. 3 where the first interrupt table 122B is shown, and the second interrupt table 122C (FIG. 1) is not. When the operating system 270 is used in partition 272 of partitioned system 200, the first interrupt table 270B is present in the operating system 270 but never used. Only the second interrupt table 270C is used. This can be seen in the right part of FIG. 3 where the second interrupt table 270C is shown, and the first interrupt table 270B (FIG. 2) is not. As a result, as far as the processing of interrupts is concerned, the operating system 122 of FIG. 1 can also be used in place of the operating system 270 in partition 272 in FIG. 2; and, similarly, the operating system 270 in the partition 272 of FIG. 2 can also be used in place of the operating system 122 of FIG. 1.

By following two separate code paths, one binary image of the interrupt handlers (herein referred to as the common, mode-independent interrupt handlers) can be used in both non-partitioned and partitioned systems. With reference to FIG. 3, in non-partitioned system 100, the code path goes from the first interrupt table 122B to the common, mode-independent interrupt handler 340. In partitioned system 200, the code path goes from the partition manager interrupt table 282 to the second interrupt table 270C, and finally to the common, mode-independent interrupt handler 340.

The operating system 122 of FIG. 1 and the operating system 270 in the partition 272 of FIG. 2 have identical common, mode-independent interrupt handlers (122A, 270A), first interrupt tables (122B, 270B), second interrupt tables (122C, 270C), and save areas (122D, 270D). The rest of the two operating systems may be made identical so that the operating systems 122 and 270 are identical by using the same approach applying to the interrupt handlers. That is, whenever a particular service provided by an operating system cannot run on both non-partitioned and partitioned systems, two separate code paths are provided and followed to settle the differences before the service is called. Examples of services provided by an operating system that can use the approach of the present invention to advantage include READ FILE and WRITE FILE system calls.

While the foregoing is directed to embodiments of the present invention, other and further embodiments of the invention may be devised without departing from the basic scope thereof, and the scope thereof is determined by the claims that follow.

What is claimed is:

1. A method of handling an interrupt in a computer system, the method comprising:
   if the computer system is in a non-partitioned mode of operation, executing a first code portion and then executing a common mode-independent interrupt handler; and
   if the computer system is in a partitioned mode of operation, executing a second code portion and then executing the common mode-independent interrupt handler.

2. The method of claim 1 wherein at least one of executing the first code portion and executing the second code portion comprises:
   saving the content of at least one register of the computer system; and
   transferring control of the computer system to the common mode-independent interrupt handler.

3. The method of claim 2, wherein saving the content of at least one register of the computer system comprises saving the content of a first register that contains an address of an instruction interrupted by the interrupt.

4. The method of claim 3, wherein saving the content of at least one register of the computer system further comprises saving the content of a second register that contains the content of a machine status register of the computer system immediately before the interrupt.

5. The method of claim 2, wherein the executing the common mode-independent interrupt handler comprises:
   saving the content of at least one register; and
   servicing the interrupt.

6. The method of claim 1, wherein executing the first code portion and executing the second code portion each comprises:
   saving the content of at least one register of the computer system; and
   transferring control of the computer system to the common mode-independent interrupt handler.

7. The method of claim 6, wherein the executing the common mode-independent interrupt handler comprises:
   saving the content of at least one register; and
   servicing the interrupt.

8. The method of claim 1, wherein executing the first code portion comprises enabling relocation immediately before executing the common mode-independent interrupt handler.

9. The method of claim 8, further comprising executing a partition manager code portion before executing the second code portion, the executing the partition manager code portion comprising enabling relocation immediately before executing the second code portion.

10. The method of claim 9, wherein the partition manager code portion is contained in a partition manager interrupt table comprising a plurality of entries, each entry containing a code portion.

11. The method of claim 1, wherein the first and second code portions are in a single operating system running in the computer system.

12. The method of claim 11, wherein the first code portion is contained in a first interrupt table comprising a plurality of entries, each entry containing a code portion which, when executed, calls an associated interrupt handler.

13. The method of claim 12, wherein the second code portion is contained in a second interrupt table comprising a plurality of entries, each entry containing a code portion which, when executed, calls an associated interrupt handler.

14. The method of claim 1, wherein the first code portion is contained in a first interrupt table comprising a plurality of entries, each entry containing a code portion which, when executed, calls an associated interrupt handler.

15. The method of claim 14, wherein the second code portion is contained in a second interrupt table comprising a plurality of entries, each entry containing a code portion which, when executed, calls an associated interrupt handler.

16. A computer system, comprising:
   a system bus;
   at least one processor coupled to the system bus; and
   a memory coupled to the system bus, the memory containing at least one operating system comprising a first code portion, a second code portion, and a common mode-independent interrupt handler; wherein
      if the computer system runs in a non-partitioned mode of operation, the processor is configured to execute the first code portion and then execute the common mode-independent interrupt handler, and
      if the computer system runs in a partitioned mode of operation, the processor is configured to execute the second code portion and then execute the common mode-independent interrupt handler.

17. The computer system of claim 16, wherein the first code portion comprises a jump instruction to the common mode-independent interrupt handler.

18. The computer system of claim 17, wherein the second code portion comprises a jump instruction to the common mode-independent interrupt handler.

19. The computer system of claim 16, wherein
   the first code portion is contained in a first interrupt table comprising a plurality of entries, each entry containing a code portion which, when executed, calls an associated interrupt handler; and
   the second code portion is contained in a second interrupt table comprising a plurality of entries, each entry containing a code portion which, when executed, calls an associated interrupt handler.

20. A computer readable medium storing a software program that, when executed, causes at least one processor of a computer system to perform operations comprising:
   if the computer system is in a non-partitioned mode of operation, executing a first code portion and then executing a common mode-independent interrupt handler; and
   if the computer system is a partitioned mode of operation, executing a second code portion and then executing the common mode-independent interrupt handler.

21. The computer readable medium of claim 20, wherein at least one of executing the first code portion and executing the second code portion comprises:
   saving the content of at least one register; and
   transferring control of the computer system to the common mode-independent interrupt handler.

22. The computer readable medium of claim 20, wherein executing the first code portion and executing the second code portion each comprise:
   saving the content of at least one register; and
   transferring control of the computer system to the common mode-independent interrupt handler.

23. The computer readable medium of claim 22, wherein the executing the common mode-independent interrupt handler comprises:
   saving the content of at least one register; and
   servicing the interrupt.

24. The computer readable medium of claim 20, wherein executing the first code portion comprises enabling relocation at an end of the first code portion.

25. The computer readable medium of claim 24, wherein the operations further comprise executing a partition manager code portion before executing the second code portion.

26. The computer readable medium of claim 25, wherein executing the partition manager code portion comprising enabling relocation at the end of the partition manager code portion.

27. The computer readable medium of claim 20, wherein the operations further comprise executing a partition manager code portion before executing the second code portion.

28. The computer readable medium of claim 27, wherein executing the partition manager code portion comprising enabling relocation at the end of the partition manager code portion.

29. The computer readable medium of claim 20, wherein
   the first code portion is contained in a first interrupt table comprising a plurality of entries, each entry containing a code portion which, when executed, calls an associated interrupt handler; and
   the second code portion is contained in a second interrupt table comprising a plurality of entries, each entry containing a code portion which, when executed, calls an associated interrupt handler.

* * * * *